United States Patent
Carrois et al.

(10) Patent No.: US 9,816,646 B2
(45) Date of Patent: Nov. 14, 2017

(54) THREADED CONNECTION FOR DRILLING AND WORKING HYDROCARBON WELLS

(75) Inventors: Fabien Carrois, Valenciennes (FR); Yann Gallois, Frasnoy (FR); Francois Conrad, Belo Horizonte (BR)

(73) Assignees: VALLOUREC OIL AND GAS FRANCE, Aulnoye-Aymeries (FR); NIPPON STEEL & SUMITOMO METAL CORPORATION, Tokyo (JP)

( * ) Notice: Subject to any disclaimer, the term of this patent is extended or adjusted under 35 U.S.C. 154(b) by 1111 days.

(21) Appl. No.: 13/977,240

(22) PCT Filed: Dec. 12, 2011

(86) PCT No.: PCT/EP2011/006259
§ 371 (c)(1),
(2), (4) Date: Jun. 28, 2013

(87) PCT Pub. No.: WO2012/089305
PCT Pub. Date: Jul. 5, 2012

(65) Prior Publication Data
US 2013/0277963 A1    Oct. 24, 2013

(30) Foreign Application Priority Data
Dec. 28, 2010    (FR) ..................................... 10 05163

(51) Int. Cl.
*F16L 25/00*    (2006.01)
*F16L 15/00*    (2006.01)
(Continued)

(52) U.S. Cl.
CPC .......... *F16L 15/006* (2013.01); *E21B 17/042* (2013.01); *F16L 15/06* (2013.01)

(58) Field of Classification Search
CPC ........ F16L 15/006; F16L 15/06; E21B 17/042
(Continued)

(56) References Cited

U.S. PATENT DOCUMENTS

| | | | |
|---|---|---|---|
| 1,394,791 A | * | 10/1921 | Runyan ................. E21B 17/042 285/115 |
| 1,671,579 A | * | 5/1928 | Greve ................... E21B 17/042 285/148.1 |

(Continued)

FOREIGN PATENT DOCUMENTS

| | | |
|---|---|---|
| GB | 2 074 685 | 11/1981 |
| JP | 2002-526701 A | 8/2002 |

(Continued)

OTHER PUBLICATIONS

International Search Report dated Jan. 12, 2012 in PCT/EP11/006259 Filed Dec. 12, 2011.

*Primary Examiner* — Gregory J Binda
(74) *Attorney, Agent, or Firm* — Oblon, McClelland, Maier & Neustadt, L.L.P.

(57) ABSTRACT

A threaded connection including first and second tubular components, each including a respective male and female end, the male end includes at least one threaded zone on its external peripheral surface and ending in a terminal surface, the female end includes at least one threaded zone on its internal peripheral surface and ending in a terminal surface, the threaded zones including, over at least a portion of their length, threads each including, viewed in longitudinal section passing through the axis of the tubular component, a thread crest, a thread root, a load flank, and a stabbing flank. Profiles of the male and female load flanks, viewed in longitudinal section passing through the axis of revolution of the connection, are a continuous curve with a convex or concave form, the profile of the male flanks being complementary to that of the female flanks over at least 70% of the continuous curve.

11 Claims, 4 Drawing Sheets

(51) Int. Cl.
*E21B 17/042* (2006.01)
*F16L 15/06* (2006.01)

(58) Field of Classification Search
USPC ......... 285/333–334, 355, 390; 411/410, 411, 411/416, 436
See application file for complete search history.

(56) References Cited

U.S. PATENT DOCUMENTS

| | | | |
|---|---|---|---|
| 2,294,160 A * | 8/1942 | Crane | F16L 49/06 |
| | | | 285/230 |
| 2,909,380 A | 4/1958 | Hoye et al. | |
| 3,258,284 A * | 6/1966 | Phipps | E21B 17/0426 |
| | | | 285/390 |
| 3,794,092 A * | 2/1974 | Carlson | B21H 3/025 |
| | | | 411/310 |
| 4,004,832 A * | 1/1977 | Connelly | F16L 15/06 |
| | | | 285/333 |
| RE30,647 E | 6/1981 | Blose | |
| 4,865,364 A * | 9/1989 | Nobileau | F16L 15/003 |
| | | | 285/333 |
| RE34,467 E | 12/1993 | Reeves | |
| 5,427,418 A * | 6/1995 | Watts | E21B 17/042 |
| | | | 285/333 |
| 6,726,689 B2 * | 4/2004 | Jackson | A61B 17/7032 |
| | | | 411/411 |
| 2009/0250927 A1 * | 10/2009 | Pallini, Jr. | F16L 15/004 |
| | | | 285/334.2 |

FOREIGN PATENT DOCUMENTS

| | | |
|---|---|---|
| JP | 2005-511990 A | 4/2005 |
| JP | 2005-351324 A | 12/2005 |
| JP | 2008-144955 A | 6/2008 |
| WO | WO 03/048623 A1 | 6/2003 |
| WO | 2006 092649 | 9/2006 |

* cited by examiner

THREADED CONNECTION FOR DRILLING AND WORKING HYDROCARBON WELLS

BACKGROUND

1. Field of the Disclosure

The present invention relates to a tubular component used for drilling and working hydrocarbon wells, and more precisely to the end of such a component, said end being of the male or female type and capable of being connected to a corresponding end of another component also used for drilling and working hydrocarbon wells. The invention also relates to a threaded connection resulting from the connection of two tubular components by making up.

2. Description of the Related Art

The term component "used for drilling and working hydrocarbon wells" means any element with a substantially tubular form intended to be connected to another element of the same type or otherwise in order in the end to constitute either a drill stem for a hydrocarbon well or a riser for maintenance such as work-over risers or for working such as risers, or a casing string or tubing string involved in working a well. In particular, the invention is applicable to components used in a drill stem such as, for example, drill pipes, heavy weight drill pipes, drill collars and parts for connecting pipes and heavy weight pipes known as tool joints.

In known manner, each component used in a drill stem generally comprises an end provided with a male threaded zone and/or an end provided with a female threaded zone, each intended to be connected by makeup with the corresponding end of another component, the assembly defining a connection. The stem constituted thereby is caused to rotate when drilling at the surface of the well; for this reason, the components have to be made up into each other with a high torque in order to be able to transmit a sufficient rotational torque so that a well can be drilled without there being any breakout or indeed overtorquing.

In conventional products, the makeup torque is generally reached firstly by means of cooperation by tightening of inner and/or outer abutment surfaces provided on each of the components and secondly by means of cooperation by tightening of the flanks of the threadings of the mutually made up components. However, because the makeup torques required are steadily increasing because drilling conditions are becoming more and more complex (great depths, horizontal drilling, etc), it is necessary to transmit more torque through the connections. Since the extent of the abutment surfaces is a fraction of the tube thickness, and more particularly of the tool joints in the case of drilling components, the critical plastification threshold of the abutment surfaces is rapidly reached when too high a make-up torque is applied. In addition, one solution consists of transmitting more torque into the threading in order to relieve the abutment surfaces.

Solutions have been developed employing self-locking threads such as those described in prior art documents U.S. Pat. No. Re 30 647 and U.S. Pat. No. Re 34 467. In that type of self-locking thread, the thread flanks (also termed teeth) of the male end and the threads (also termed teeth) of the female end have a constant lead but the thread widths vary.

More precisely, the distance between the load flanks is constant, as is the lead (distance) between the stabbing flanks, but said distance between the load flanks differs, however, from said distance between the stabbing flanks.

More precisely, the widths of the thread (or teeth) crests progressively increase for the threads of the male end, respectively female end, with distance from the male end, respectively female end.

Thus, during makeup, the male and female threads (or teeth) finish by being locked into each other in a position corresponding to the locking point. For this reason, the makeup torque is taken up by the whole of the contact surfaces between the flanks, i.e. a total surface which is very much greater than that constituted by the prior art abutment surfaces. However, it is not easy to combine abutment surfaces with this type of threading since the configurations of threadings known as self-locking threadings necessitates synchronizing docking the abutment surfaces with those of the thread flanks.

The solutions of API 7 use inner and/or outer abutment surfaces combined with threadings in the form of a truncated V leaving a clearance between the thread roots and crests.

BRIEF SUMMARY

The present invention proposes novel threading profiles that can transmit more torque into the threading, in particular by increasing the contact surface between the flanks of the threads.

More precisely, the invention provides a threaded connection comprising a first and a second tubular component, each being provided with a respective male and female end, the male end comprising at least one threaded zone on its external peripheral surface and ending in a terminal surface, the female end comprising at least one threaded zone on its internal peripheral surface and ending in a terminal surface, the threaded zones comprising, over at least a portion of their length, threads each comprising, viewed in longitudinal section passing through the axis of the tubular component, a thread crest, a thread root, a load flank and a stabbing flank, characterized in that the profiles of the male and female load flanks, viewed in longitudinal section passing through the axis of revolution of the connection, are a continuous curve with a convex or concave form, the profile of the male flanks being complementary to that of the female flanks over at least 70%, preferably 90% of said continuous curve.

Optional characteristics of the invention, which may be complementary or substitutional, are defined below.

The profile of the male and female stabbing flanks as well as the profile of the male and female load flanks may be a continuous curve with a convex or concave form, the profile of the stabbing flanks being orientated in a manner opposite to the profile of the load flanks for the same portion of threaded zone.

The profile of the male stabbing flanks, viewed in longitudinal section passing through the axis of the connection, may be convex, the profile of the male load flanks being concave.

The profile of the stabbing flanks and/or the profile of the load flanks, viewed in longitudinal section passing through the axis of the connection, may be a circular arc with a radius in the range 25 to 127 mm.

The stabbing flanks and the load flanks may be connected at the thread crest and/or the thread root by means of a connecting fillet with a radius in the range 3 to 13 mm.

The angle of the stabbing flanks and the angle of the load flanks, each considered with respect to an axis perpendicular to the axis of revolution of the connection, may be equal.

The angle of the stabbing flanks may be greater than the angle of the load flanks by at most 30 degrees.

The angle of the stabbing flanks and the angle of the load flanks, each considered with respect to an axis perpendicular to the axis of revolution of the connection, may be in the range 10° to 80°.

The lead of the threaded zones may be in the range 2 mm to 13 mm.

The threaded zones may have a taper generatrix forming an angle with the axis of the connection in the range 1.5 to 8 degrees.

Said component maybe a drilling component.

The peaks of the female end may be blunted such that a clearance is provided between the crest of the teeth of the female threaded zone and the bottom of the crests of the male threaded zone when the portions of the threaded zones are made up into each other.

The terminal surface of the male end may abut against a shoulder provided inside the female end when the portions of the threaded zones are made up into each other.

The terminal surface of the female end may abut against a shoulder provided on the exterior of the male end when the portions of the threaded zones are made up into each other.

The male and female ends may each respectively comprise a sealing surface that can cooperate together in interfering contact when the portions of the threaded zones are made up one into the other.

The axial interference between the load flanks and between the stabbing flanks may be more than 0.05 mm when the portions of the threaded zones are made up into each other.

BRIEF DESCRIPTION OF THE SEVERAL VIEWS OF THE DRAWINGS

The characteristics and advantages of the invention are discussed in more detail in the description below, made with reference to the accompanying drawings.

DETAILED DESCRIPTION

Figure 1:
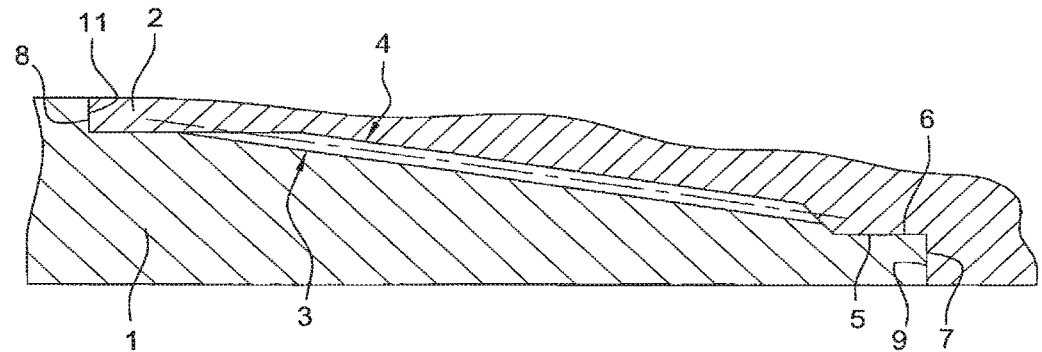
FIG. 1 is a diagrammatic view of a connection resulting from joining two tubular components by making up their respective threaded zones in accordance with the invention.

The threaded connection shown in FIG. 1 is used in the case of drilling applications and comprises, in known manner, a first tubular component with an axis of revolution 10 provided with a male end 1 and a second tubular component with an axis of revolution 10 provided with a female end 2. The two ends 1 and 2 each terminate in a terminal surface 7, 8 orientated radially with respect to the axis of revolution 10 of the threaded connection, and are respectively provided with threaded zones 3 and 4 which cooperate together for mutual connection of the two components by makeup. It should be noted that the axis 10 of the threaded connection is also the axis of revolution of the tubular components 1 and 2. The term "orientated radially with respect to the axis 10 of the threaded connection" means that the terminal surfaces 7 and 8 of the ends 1 and 2 are inclined with respect to a plane perpendicular to the axis 10 of the threaded connection by at most 20 degrees.

In a subsidiary manner, if necessary, and more particularly in the case of applications intended for working hydrocarbon wells rather than drilling applications, the connection may comprise a seal against fluids moving both inside the tubular connection and outside the tubular connection. This seal is provided by two metal/metal sealing surfaces 5, 6 located close to the terminal surface 7 of the male end 1. More precisely, the sealing surface 6 is disposed on the internal peripheral surface of the female end 2 close to the terminal surface 7 of the male end 1, which is itself orientated in a straight line substantially perpendicular to the axis 10 of the connection. Facing the sealing surface 6, on the outer peripheral surface of the male end 1, is the sealing surface 5. The two sealing surfaces are positioned so that they come into interfering contact when the male end is made up into the female end. An "interfering contact" is obtained because the external diameter of the male end 1 at the sealing surface 5 is slightly greater than the internal diameter of the female end 2 at the sealing surface 6. Contact between the metal/metal sealing surfaces 5, 6 may be two cones, two toruses, or a torus and a cone, for example.

When the first and the second tubular components are made up together into the final position, the terminal surfaces 7, 8 of respectively the male end 1 and the female end 2 are each in abutment respectively against a shoulder 9 provided inside the female end and a shoulder 11 provided on the outer surface of the male end. It should be noted that the final position is generally acquired when the torque reaches a given reference value. This means that as a function of the selected connection and use, the users refer to a reference torque which has to be applied when using the components.

Figure 2:
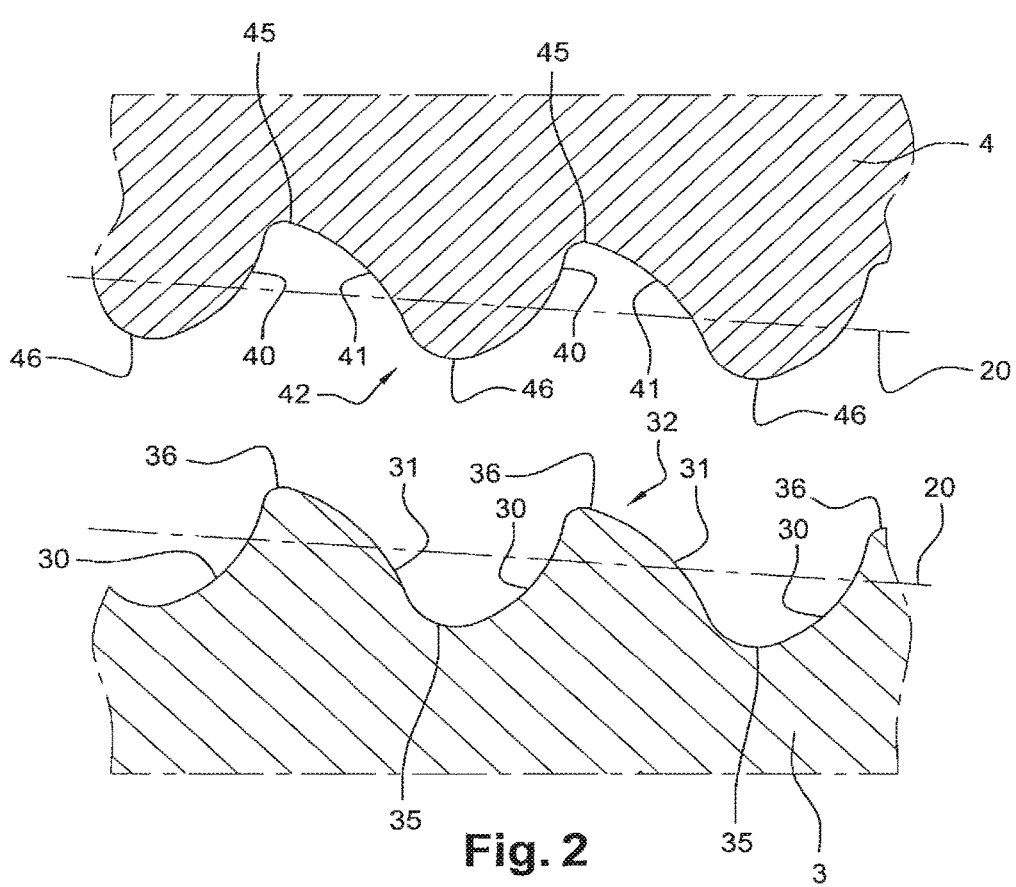
FIG. 2 is a detailed diagrammatic view of the threaded zones of two tubular components of the connection of FIG. 1, shown in a non-connected manner.

FIG. 2 shows a longitudinal sectional view passing through the axis 10 of the two threaded zones of the connection of FIG. 1, that with reference numeral 3 being male and that with reference numeral 4 being female and intended for mutual cooperation by making up. FIG. 2 is an exploded view of the connection shown in FIG. 1 since when the ends 1, 2 of the tubular component are made up into each other, the threaded zones 3, 4 are fitted one into the other so as to cooperate on makeup. The threads 32 belong to the threaded zone 3 of the male end 1 of a tubular component and each comprise a stabbing flank 31, a load flank 30, a thread root 35 and a thread crest 36. Similarly, the threads 42 belong to the threaded zone 4 of the female end 2 of a tubular component and each comprises a stabbing flank 41, a load flank 40, a thread root 45 and a thread crest 46.

Regarding the male end and in accordance with one embodiment of the invention, the profile of the stabbing flanks 31 of the male threads as well as the profile of the load flanks 30 of the male threads (and viewed in longitudinal section passing through the axis 10 of the tubular component) are each a continuous curve with either a convex form or a concave form, the profiles of the stabbing flanks 31 and the load flanks 30 being orientated in an opposing manner. More precisely, the profile of the stabbing flanks 31 of the male threads is convex while the profile of the load flanks 30 is concave. In other words, the profiles of the male stabbing flanks and the male load flanks have opposing curvatures. The term "curved profile" means that the profile is not rectilinear.

Regarding the female end and in accordance with one embodiment of the invention, the profile of the stabbing flanks 41 of the female threads as well as the profile of the load flanks 40 of the female threads (and viewed in longitudinal section passing through the axis 10 of the tubular component) are each a continuous curve with a convex form or a concave form, the profiles of the stabbing flanks 41 and the load flanks 40 being orientated in an opposing manner. More precisely, the profile of the stabbing flanks 41 of the female threads is concave while the profile of the load flanks 40 of the female threads is convex. In other words, the profiles of the female stabbing flanks and the female load flanks have opposing curvatures.

Further, the profiles of the flanks of the male threads and the profile of the flanks of the female threads, the flanks of the male threads having been brought into contact with the flanks of the female threads, are complementary. This means that the continuous curves each constituting the profiles of the male and female load flanks coincide over at least 70% and preferably 90%. Similarly, the continuous curves each constituting the profiles of the male and female stabbing flanks coincide over at least 70%, preferably 90%.

Clearly, the reverse configuration may also be provided, wherein the profile of the stabbing flanks 31 of the male threads is concave while the profile of the load flanks 30 is convex. In complementary manner, the profile of the stabbing flanks 41 of the female threads is then convex while the profile of the load flanks 40 of the female threads is concave.

Clearly, it is also possible to have the configuration in which only the profile of the load flanks 30 of the male threads (and viewed in longitudinal section passing through the axis 10 of the tubular component) is a continuous curve with a convex or concave form; the profiles of the stabbing flanks 31 may be rectilinear. The profile of the load flanks 40 of the female threads is thus complementary to that of the load flanks 30 of the male threads such that the continuous curves each constituting the profiles of the male and female load flanks coincide over at least 70%, preferably 90%.

Regardless of the selected configuration, when the male and female elements are made up together to form a connection, a contact surface is obtained between the flanks which is larger with curved profiles than with rectilinear profiles. However, since the makeup torque is proportional to the total surface area of the surfaces in contact, the larger the contact surface of the flanks, the higher is the makeup torque obtained.

As can be seen in FIG. 1, the connection comprises an inner abutment and an outer abutment. Regarding the outer abutment, the first and the second tubular components are made up together so that the terminal surface 8 of the female end 2 abuts against the shoulder 11 provided on the external surface of the male end 1. Regarding the inner abutment, the first and second tubular components are made up together such that the terminal surface 7 of the male end 1 abuts against the shoulder 9 provided on the interior surface of the female end 2.

A configuration is also possible wherein both an inner abutment or an outer abutment are provided.

Figure 8:
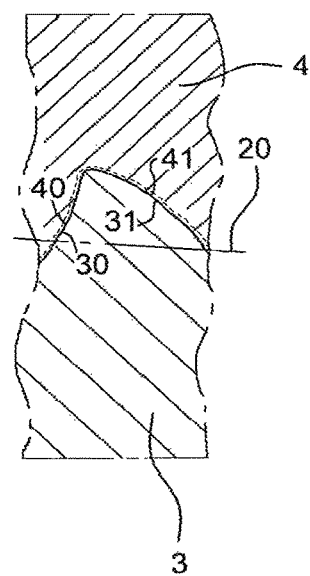
FIG. 8 is a diagrammatic view of a non-limiting illustrative embodiment of an axial interference between the load flanks and between the stabbing flanks obtained by using a larger thread width than the width of a thread root.

A configuration is also possible wherein neither an inner abutment nor an outer abutment is provided and wherein the male and female load flanks and the stabbing flanks enter into contact at a certain stage of makeup. There is then a positive axial interference between the male and female load flanks and between the male and female stabbing flanks, thereby constituting the makeup torque. Advantageously, this interference is more than 0.05 mm. The axial interference is obtained by using a larger thread width than the width of the thread roots, as shown in one illustrative non-limiting example in FIG. 8.

At the same time, it is also advantageous to maximize the surface area of the contact surface at the load flanks 30, 40 so as to take up the makeup torque to the best possible extent. Advantageously, it is preferable for at least 90% of the surface area of the male and female load flanks to be in contact. This means that at least 90% of the curved profiles of the male and female load flanks, with reference to a sectional view along a longitudinal axis passing through the axis 10 of the connection, must be in contact.

In order to reduce the risks of stress concentrations, the load flanks and the stabbing flanks are connected tangentially at the thread root and at the thread crest using connecting fillets.

Broadly speaking, the term "curved profile flanks" means flanks the profile of which follows the shape of an elliptical portion, an arc of a circle, or a succession of tangentially connected circular arcs. Clearly, said curves are continuous in that they do not have any singularities. They also follow a profile which is completely concave or completely convex, which excludes the possibility of having a point of inflexion as is the case in flanks with an "S" shaped profile.

Figure 6:
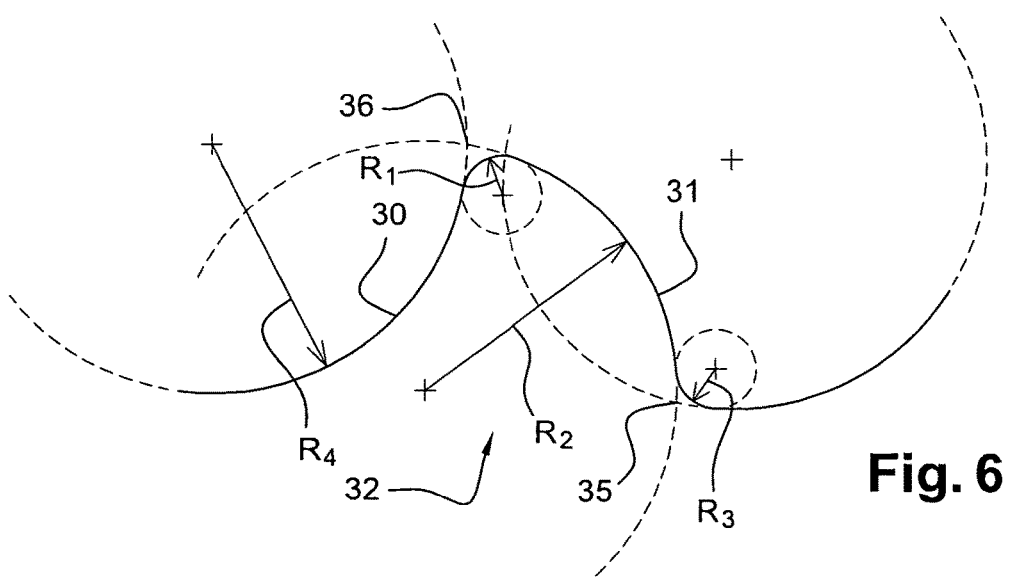

FIG. 6 shows a detailed view in longitudinal section passing through the axis 10 of the male threaded zone in a particular configuration. The male flanks 32 have a concave circular arc portion for the load flanks and convex circular arc portion for the stabbing flanks.

The connecting fillets are also circular arcs with a respective radius of R1 at the thread crest and R3 at the thread root. Preferably, the radius R1 of the connecting fillet at the thread crest and the radius R3 of the connecting fillet at the thread root is each in the range 3 mm to 13 mm.

Preferably, the radius R4 for the profile of the load flanks and the radius R2 for the stabbing flank profile are each in the range 25 mm to 127 mm. The upper value of 127 mm means that a sufficient curvature can be provided to ensure a sufficiently large contact surface which is thus sufficiently capable of supporting a high make-up torque. The lower value of 25.4 mm means that a sufficient thread height is provided which is adapted to the diameter of the tubular components.

Clearly, the radii R4 and R2 of the load flank and stabbing flank profiles are not necessarily identical. However, it appears that the interval constituted by the lower and upper values of 25.4 mm and 127 mm in the first place concern the radius R4 of the load flanks in the case in which the connection comprises an abutment. In fact, the load flanks take up a portion of the make-up torque. For this reason, the radius of curvature R2 of the stabbing flanks is less critical.

It should be noted that it is possible to have configurations wherein the radius R2 of the stabbing flanks is very high, whereupon a quasi-rectilinear profile is produced for the stabbing flanks.

Figure 3:
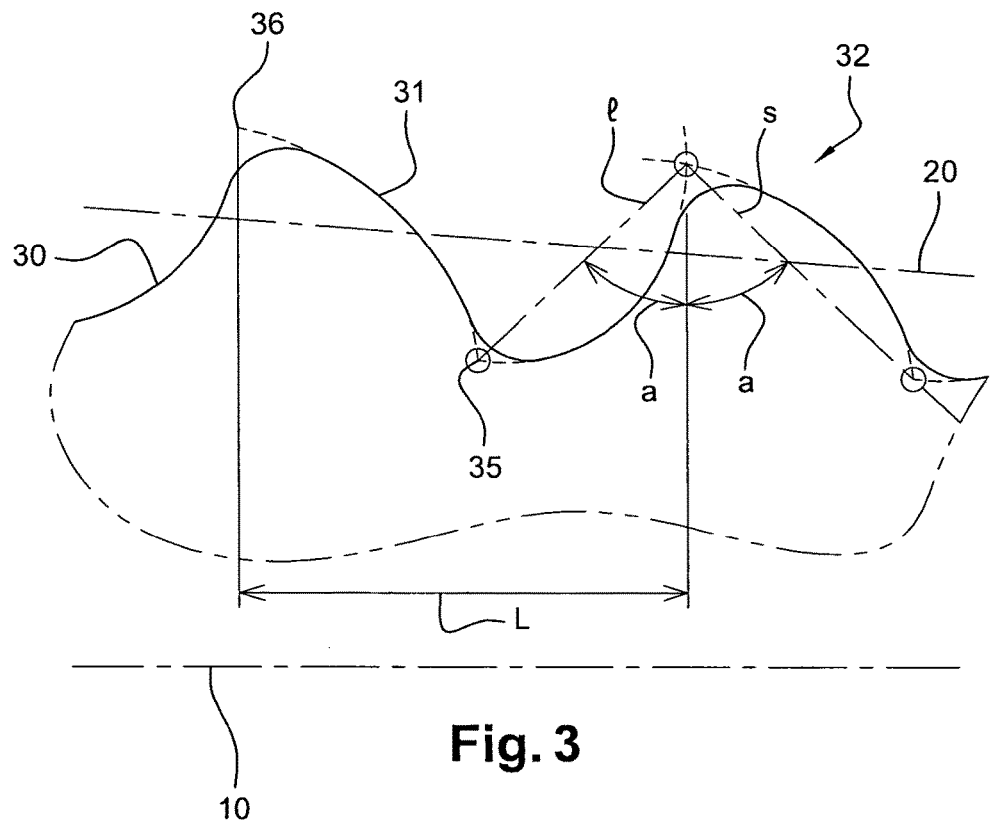
FIGS. 3 to 6 are detailed views of a thread of a male end of a tubular connection component in particular embodiments of the invention.
Figure 4:
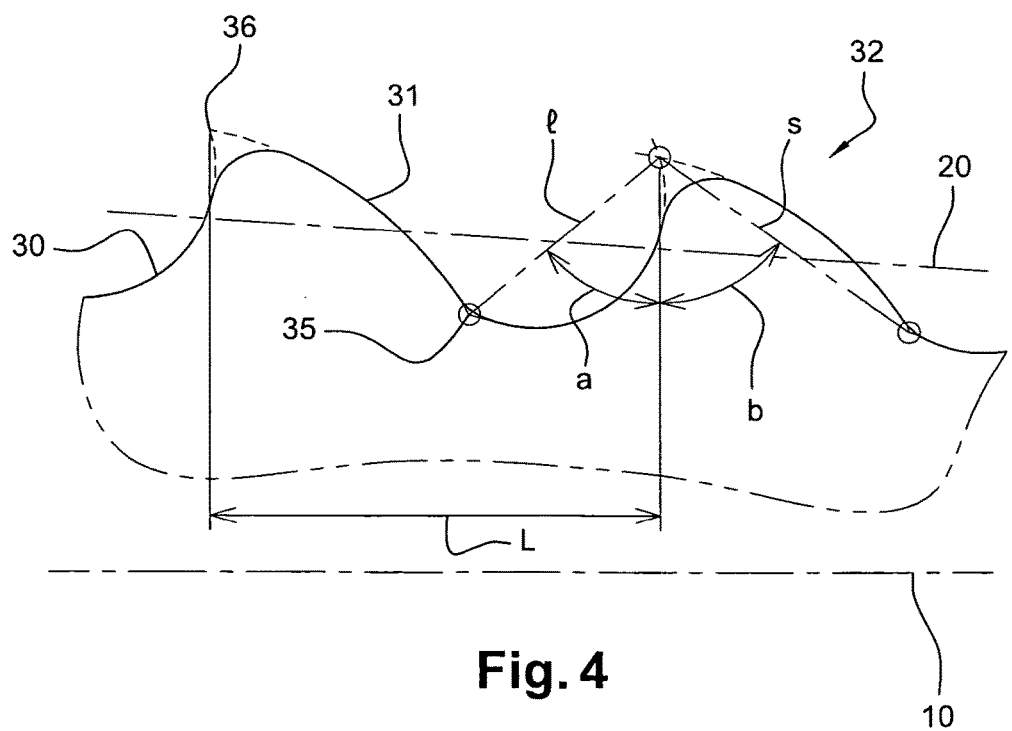
Figure 5:
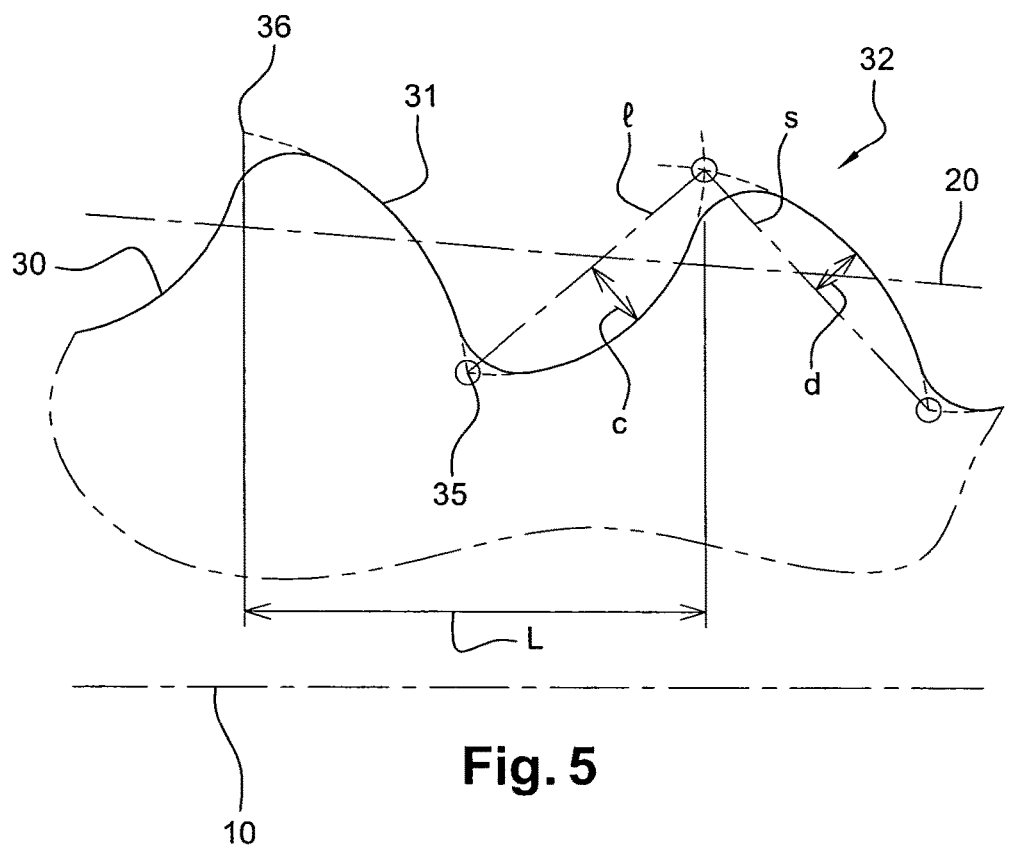

FIGS. 3, 4 and 5 describe different threading profiles with different angles of the load flanks and the stabbing flanks.

In FIG. 3, the chord lines l for the curves of the load flanks and the chord lines s for the curves of the stabbing flanks form an identical angle a with a line perpendicular to the axis 10 of the tubular component. The chord lines l and s are defined by means of the intersections between the curve which supports the load flank profile and the curve which supports the stabbing flank profile.

It should be noted that the position of the thread crests 36 is defined by the intersection between the curve which supports the load flank profile and the curve which supports the stabbing flank profile. Similarly, the position of the thread roots 35 is defined by the intersection between the curve which supports the load flank profile and the curve which supports the stabbing flank profile. The lead of the threading, L, is then equal to the distance between two consecutive thread crests, said distance also being equal to the distance between two consecutive thread roots.

In the case in which the inclination of the load flanks and the stabbing flanks is identical, and in the case in which the curvature of the load flanks and the stabbing flanks is identical, the connection has balanced characteristics both in tension and in compression. This configuration means that threaded zones can be produced with good tensile and compressive characteristics.

In FIG. 4, the chord lines l for the curves of the load flanks and the chord lines s for the curves of the stabbing flanks form a different angle, respectively a and b, with a line perpendicular to the axis 10 of the tubular component. The chord lines l and s are also defined by means of intersections between the curve which supports the load flank profile and the curve which supports the stabbing flank profile.

In the case in which the inclination of the stabbing flanks is greater than the inclination of the load flanks (the load flanks are more vertical than the stabbing flanks), compressive strength is favoured. This configuration should be preferred for drilling components used close to the drilling head, where compressive stresses are high. It is preferable for the angle of the stabbing flanks to be greater than the angle of the load flanks by at most thirty degrees. Hooking between the threads is in fact lost, and the male and female elements may jump out.

In the case in which the inclination of the stabbing flanks is smaller than the inclination of the load flanks (the load flanks are less vertical than the stabbing flanks), tensile strength is favoured. This configuration should be preferred for drilling components used in places other than the downhole stem, i.e. far away from the drilling head.

In FIG. 5, the profile of the load flanks and the stabbing flanks is elliptical. Preferably, the arrows c between the chord lines passing through the ends of the load flank profiles and the arrows d between the chord lines passing through the ends of the stabbing flank profiles should be in the range 3 mm to 13 mm.

The position of the thread crests 36 should also be noted; it is defined by the intersection between the curve which supports the profile of the load flank and the curve which supports the profile of the stabbing flank. Similarly, the position of the thread roots 35 is defined by the intersection between the curve which supports the profile of the load flank and the curve which supports the profile of the stabbing flank. The lead of the threading, L, is then equal to the distance between two consecutive thread crests, said distance also being equal to the distance between two consecutive thread roots.

Preferably, the angle of the stabbing flanks and the angle of the load flanks are in the range 10° to 80°. The lower limit of 10° corresponds to the fact that the components have to be capable of being made up and the upper limit of 80° corresponds to the fact that a certain hooking must be maintained between the threads.

In order to guard against the risks of galling and/or in order to encourage the flow of any lubricants used for makeup, it is advantageous to provide the thread crests with a blunted profile. This type of blunted profile may be applied to either the male crests or to the female crests or to both.

The term "blunted profile" means a profile which is flatter at the thread crest than that generated by the connecting fillets in the form of a circular arc. These blunted profiles may thus be based on elliptical profiles connecting the load flanks to the stabbing flanks at the thread crest in a tangential manner.

Figure 7:
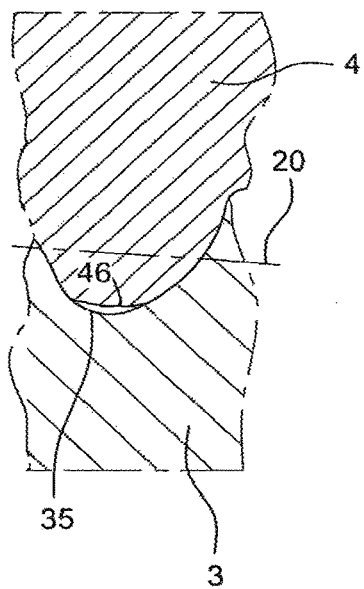
FIG. 7 is a diagrammatic view of a non-limiting illustrative embodiment of a clearance provided between a crest of tooth of the female threaded zone and a bottom of crests of the male threaded zone.

In one illustrative non-limiting example, as shown in FIG. 7, peaks of the female end 2 may be blunted such that a clearance is provided between the crest 46 of the teeth of the female threaded zone 4 and the bottom of the crests 36 of the male threaded zone 3 when the portions of the threaded zones are made up into each other.

Advantageously, the lead L of the threaded zones 3, 4 is in the range 2 mm to 13 mm, which corresponds to 10 and 2 TPI (ten and two threads per inch). This interval constitutes a compromise between the rapidity of makeup of the threaded elements and sufficient hooking between these threaded elements.

In order to facilitate makeup of the tubular components 1 and 2, the threaded zones 3, 4 each have a taper generatrix 20 forming an angle with the axis 10 of the tubular component which is in the range 1.5 to 8 degrees.

The invention claimed is:

1. A threaded connection comprising:
a first and a second tubular component used for drilling and working hydrocarbon wells, each including a respective male and female end, the male ends comprising at least one threaded zone on an external peripheral surface and ending in a terminal surface, the female end comprising at least one threaded zone on an internal peripheral surface and ending in a terminal surface,
the threaded zones comprising, over at least a portion of their length, threads each comprising, viewed in longitudinal section passing through an axis of the tubular components, a thread crest, a thread root, a load flank, and a stabbing flank,
wherein profiles of the male and female load flanks, viewed in longitudinal section passing through an axis of revolution of the connection, are a continuous curve with a convex or concave form, a profile of the male flanks being complementary to that of the female flanks over at least 70% of the continuous curve,
wherein profiles of the male and female stabbing flanks and the profiles of the male and female load flanks are a continuous curve with a convex or concave form, the profile of the stabbing flanks being orientated in a manner opposite to the profile of the load flanks for a same portion of the threaded zone, and
wherein the profile of the male stabbing flanks, viewed in longitudinal section passing through the axis of the connection, is convex, the profile of the male load flanks being concave.

2. A threaded connection according to claim 1, wherein the profile of the stabbing flanks or the profile of the load flanks, viewed in longitudinal section passing through the axis of the connection, is a circular arc with a radius in a range of 25 to 127 mm.

3. A threaded connection according to claim 1, wherein the stabbing flanks and the load flanks are connected at the thread crest or the thread root by a connecting fillet with a radius in a range of 3 to 13 mm.

4. A threaded connection according to claim 1, wherein a lead of the threaded zones is in a range of 2 mm to 13 mm.

5. A threaded connection according to claim 1, wherein the threaded zones include a taper generatrix forming an angle in a range 1.5 to 8 degrees with the axis of the connection.

6. A threaded connection according to claim 1, wherein crests of the female end are blunted such that a clearance is provided between a crest of teeth of the female threaded zone and a bottom of crests of the male threaded zone when portions of the threaded zones are made up into each other.

7. A threaded connection according to claim 1, wherein a terminal surface of the male end abuts against a shoulder provided on an inside of the female end when portions of the threaded zones are made up into each other.

8. A threaded connection according to claim 1, wherein a terminal surface of the female end abuts against a shoulder provided on an outside of the male end when portions of the threaded zones are made up into each other.

9. A threaded connection according to claim 1, wherein the male and female ends each respectively comprise a sealing surface that-cooperate together in interfering contact when portions of the threaded zones are made up into each other.

10. A threaded connection according to claim 1, wherein axial interference between the load flanks and between the stabbing flanks is more than 0.05 mm, when portions of the threaded zones are made up into each other.

11. A threaded connection according to claim 1, wherein the profile of the male flanks is complementary to that of the female flanks over at least 90% of the continuous curve.

* * * * *